May 6, 1924.

T. T. SNOW

PANCAKE BATTER DROPPING MACHINE

Filed March 11, 1922  2 Sheets-Sheet 1

Inventor
Theodore T. Snow;
By Watson E. Coleman
Attorney

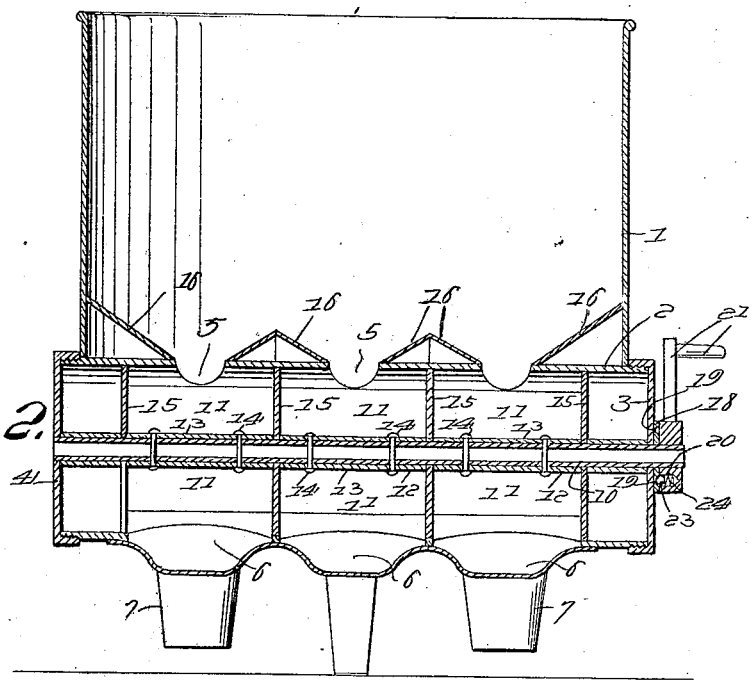
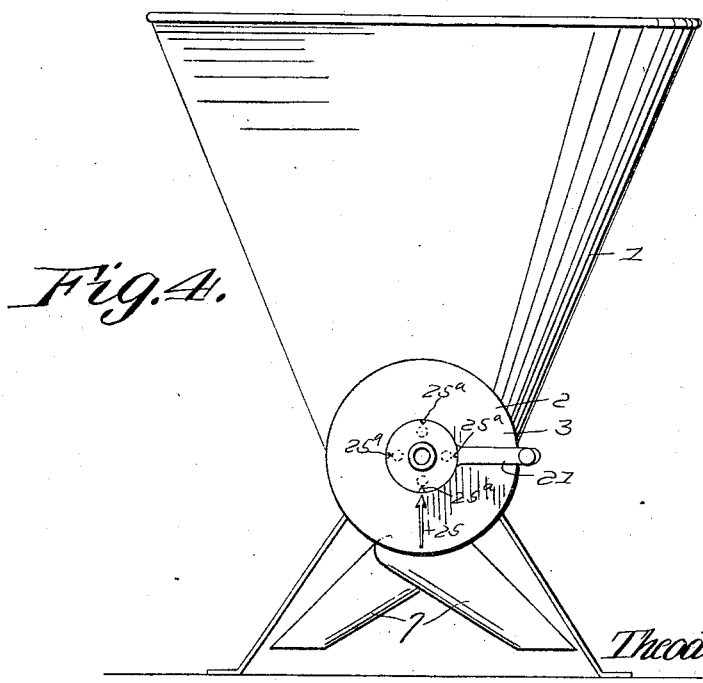

Patented May 6, 1924.

1,493,005

UNITED STATES PATENT OFFICE.

THEODORE T. SNOW, OF HOT SPRINGS, SOUTH DAKOTA.

PANCAKE-BATTER-DROPPING MACHINE.

Application filed March 11, 1922. Serial No. 542,954.

*To all whom it may concern:*

Be it known that I, THEODORE T. SNOW, a citizen of the United States, residing at Hot Springs, in the county of Fall River and State of South Dakota, have invented certain new and useful Improvements in Pancake - Batter - Dropping Machines, of which the following is a specification, reference being had to the accompanying drawings.

In dropping batter for pancakes, it has been found very difficult to make the deposits of batter uniform, in order to make the size of the cakes uniform. Also when making the deposits, they are very apt to run together, necessitating cutting them apart, before turning.

It is, therefore, the purpose of the present invention to provide a batter dropping machine, by which the deposits of batter are uniform, and properly spaced, for the purpose of obviating the foregoing disadvantages.

In order to accomplish this result, it is another purpose to provide a container for the batter including chutes at its lower end, in combination with a compartmented rotating cylinder, for the purpose of delivering uniform quantity of batter to the various chutes, which will carry the deposits to the griddle.

Still another purpose is the provision of a machine of this character, which is not only simple, efficient and practical in construction, but is sanitary in every way, due to the fact that it can be easily cleaned.

A further purpose is the provision of a revoluble member mounted in the cylinder, and provided with radial blades or vanes causing compartments to be formed, in combination with means for rotating said member, for registering the various compartments with the chutes, whereby uniform deposits of batter may be fed to and from the chutes, in combination with means for indicating when the various compartments are consecutively in register with the chutes.

A still further purpose is the provision of means for holding the revoluble bladed member with the compartments in register with the chutes, so that the full quantity of the deposits may pass through the chutes.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 2 is a longitudinal sectional view on line 2—2 of Figure 1;

Figure 4 is an end view, showing the indicating means, and also the means for rotating the bladed member.

Figure 1:
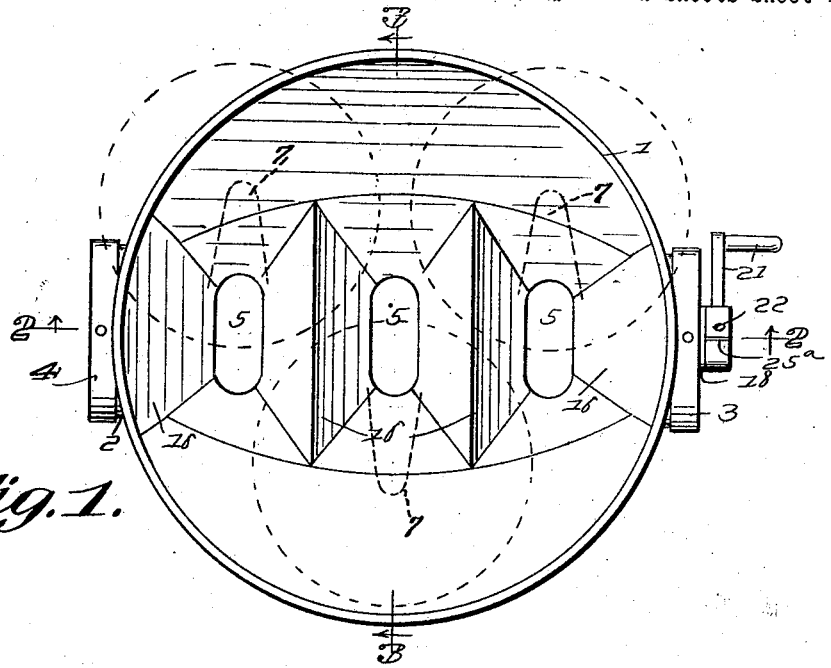
Figure 1 is a plan view of the improved batter dropping machine.
Figure 3:
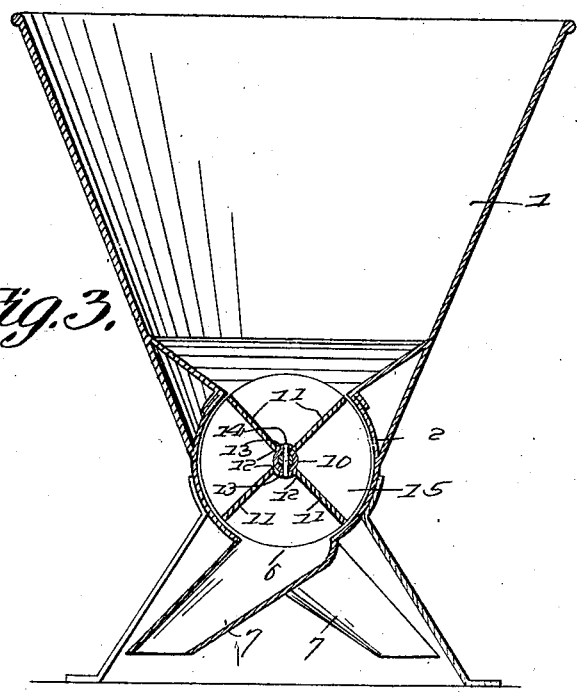
Figure 3 is a transverse sectional view on line 3—3 of Figure 1.

Referring to the drawings, 1 designates a container, which may be any size and shape, preferably the upper portion thereof may be cylindrical, though it may be of other design. The lower portion of the container terminates in a transversely disposed cylindrical casing 2, which has end heads 3 and 4, which are threaded upon the cylinder 2. This cylinder is provided at upper and lower diametrically opposite points with openings 5 and 6, the former of which permits batter from the container to pass into the cylinder 2, while the latter openings permit the discharge of the batter. Connected by means of spot welding, brazing or otherwise to the lower portion of the wall of the cylinder 2 and in register with the openings 6 are spouts 7. In fact in the present instance there are three spouts, though there may be as many as may be found convenient and practical, for the different makes of machine. These spouts are round or circular in cross section, and are tapered, and while they are disposed upon lateral downward inclinations in opposite directions, for the purpose of making the deposits of batter on the griddle without touching, they may be constructed more perpendicularly, in order to render the flow of the batter more rapid.

Mounted in suitable bearings 9 of the end heads is a revoluble shaft 10, and though this shaft is illustrated as being tubular, it is obvious that it may be otherwise constructed, for instance solid. Carried by the shaft 10 are radial blades 11. As illustrated there are two blades constructed or formed from one piece of sheet metal. In fact the sheet metal is bent at 12 to form a partial curved wall 13, which is concentric with the shaft 10. In making the bends 12 the blades are disposed, so as to assume radial positions with respect to the shaft. The sheet metal pieces from which the blades or vanes are constructed are secured to the shaft by means of the headed pins 14 and are disposed diametrically opposite each other. It is obvious that these sheet metal pieces may be spot welded or similarly fastened to the shaft, instead of by means of pins. Also mounted upon the shaft, and intermediate the sheet metal pieces (which form the blades) are circular pieces or discs 15, which divide the cylinder 2 into groups of compartments, into which the batter from the container passes. These compartments are arranged longitudinally of the cylinder, and are also disposed diametrically opposite.

The interior of the upper part of the container at points adjacent the openings 5, is provided with inclined walls 16, which act to guide the batter to the openings. These walls may be dispensed with, if so desired, and instead the openings 5 may be of sizes equal to the capacity of the various compartments caused to be formed by the vanes or blades and the discs 15. However, by means of the walls 16, there is no chance for the batter to cake or clog up in the corners of the interior of the container. By making the openings 5 the same proportions as the compartments, it is also possible to prevent the batter from caking up the corners. This method of construction will also permit the compartments to be very easily and readily cleaned.

By constructing the chutes or spouts 7 circular or round in cross section, and also by making them of the same proportions and shape of the compartments, it is also possible to prevent caking up of the batter, and enable the compartments to be more easily cleaned, especially when they assume positions under the shaft.

A circular plate or disc 18 is arranged adjacent the end head 3, and made fast thereto in any suitable manner. This disc or plate 18 is provided with a plurality of depressions 19, which may be engaged by a spring tensioned ball 20, as the shaft 10 is rotated. A suitable crank 21 is fastened by means of a transverse pin 22 upon one end of the shaft 10, and the connecting end or head of the crank has a chamber 23 in which the tensioned ball 20 is mounted. A spring 24 acts upon the ball, to cause it to engage any one of the depressions 19, for holding the shaft in position, when a group or a series of compartments register with the series of spouts or chutes. The end head 3 has on its outer face an arrow indicator 25, which is arranged perpendicularly, and also radially with respect to the head. The collar or head of the crank is provided with a plurality of grooves constituting indicators 25ᵃ, to register with the arrow 25. In fact these grooves or indicators are disposed according to the location of the compartments, or the spaces between the vanes or blades. Obviously when one set of spaces or compartments is in register with the chutes or spouts, its indicator or groove registers with the arrow. This registering of the indicators with the arrow occurs at the same time the ball engages its depression, and therefore will indicate when the compartments are in register with the spouts or chutes.

A pancake batter dropping machine herein at present disclosed is particularly adapted for family use, due to the griddle on which the pancakes are to be dropped, is round or circular in shape. For this reason the machine is provided with two spouts on one side and one on the other side, the latter being positioned between the other two, thereby in this way enabling the pancakes to be dropped in triangular arrangement on the griddle.

In order to use the machine in restaurants, hotels and like places, it merely involves the rearrangement of the compartments and the spouts, as well as making them relatively larger, so that the batter can be fed through two spouts, one extending from each end with a spout in the center, in order to give a greater parallel space for the three cakes, as the hotels and restaurants use large square griddles instead of round or circular shaped ones.

In order to employ the machine for use in connection with waffle irons it is only necessary to use a machine wherein only one compartment and one spout is used, as each waffle iron is independent and separate from the other, enabling the machine to be shifted from one waffle iron to the other for depositing the batter. The batter, to be distributed in deposits upon the top of the griddle plate, is placed in the container 1, and is adapted to feed by gravity through the openings 5 into the compartments caused to be formed by the blades 11 and the circular pieces 15, as the compartments pass the openings 5. The batter dropping machine is then placed upon the surface of the griddle plate, in the proper position, then the revoluble shaft 10 is rotated by the crank 21, and as the compartments pass the openings 6, the batter in the compartments passes out through the chutes 7. These chutes connect with compartments three in a row, and are disposed so as to feed the batter to the griddle plate, to make griddle or pancakes three in a group, as represented by the circular dotted lines in Figure 1.

As each set of compartments, three in a row, pass the openings 5, they are filled with batter, and as the compartments register with the openings 6 the batter flows out through the chutes 7.

The invention having been set forth, what is claimed is:—

1. A batter dropping device comprising a casing provided with supporting means and formed with a cylindrical compartment at its lower end, plates within the casing above said compartment for defining hopper-like portions, the top of said compartment being formed with openings communicating with said hopper-like portions, the bottom of the casing being provided with other openings, discharge chutes at the bottom of the casing in communication with said last named openings and arranged alternately in oppositely inclined directions, and dispensing means rotatable within said compartment and including a supporting shaft carrying radial blades intersected by circular disks to define a series of trough-like portions.

2. A device of the character described, comprising a casing equipped with supporting means, a cylindrical member disposed in horizontal position and extending longitudinally of the casing at the bottom thereof, inclined plates extending across the casing to define hopper portions, said plates being arranged in pairs with their lower ends spaced apart, the top of said cylindrical member being formed with openings between the spaced edges of said plates, a plurality of discharge spouts located immediately below said openings and arranged alternately in oppositely inclined positions, said cylindrical member projecting beyond the ends of the casing and carrying heads formed with bearings, a shaft journaled centrally through said heads and equipped with a handle, disks on said shaft and radial blades on the shaft intersecting the disks to define a series of trough-like compartments beneath each of said hopper portions.

In testimony whereof I hereunto affix my signature.

THEODORE T. SNOW.